(12) United States Patent
Sasakura

(10) Patent No.: US 12,736,019 B2
(45) Date of Patent: Sep. 15, 2026

(54) VEHICLE PIPE MEMBER AND METHOD FOR MANUFACTURING THE SAME

(71) Applicant: USUI CO., LTD., Shizuoka (JP)

(72) Inventor: Tomoya Sasakura, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 254 days.

(21) Appl. No.: 18/839,001

(22) PCT Filed: Feb. 27, 2023

(86) PCT No.: PCT/JP2023/007134
§ 371 (c)(1),
(2) Date: Aug. 15, 2024

(87) PCT Pub. No.: WO2023/171453
PCT Pub. Date: Sep. 14, 2023

(65) Prior Publication Data

US 2025/0163872 A1 May 22, 2025

(30) Foreign Application Priority Data

Mar. 9, 2022 (JP) ................................ 2022-036344

(51) Int. Cl.
*F02M 25/08* (2006.01)
*B01D 53/04* (2006.01)

(52) U.S. Cl.
CPC ..... *F02M 25/0872* (2013.01); *B01D 53/0407* (2013.01); *B01D 2253/102* (2013.01);
(Continued)

(58) Field of Classification Search
CPC ................................................ B01D 53/0407
See application file for complete search history.

(56) References Cited

U.S. PATENT DOCUMENTS 5,819,796 A 10/1998 Kunimitsu et al.
7,562,559 B2 * 7/2009 Chung ................. B60W 20/00 73/49.7

(Continued)

FOREIGN PATENT DOCUMENTS

CN 109139304 A 1/2019
JP 2001323814 A 11/2001

(Continued)

OTHER PUBLICATIONS

International Search Report from International Application No. PCT/JP2033/007134, Apr. 25, 2023, 4 pages with translation.

(Continued)

*Primary Examiner* — Robert A Hopkins
(74) *Attorney, Agent, or Firm* — Tucker Ellis LLP

(57) ABSTRACT

A vehicle pipe member includes a first end connected to a canister that adsorbs fuel boil-off gas in a fuel tank; a second end open to an atmosphere; a pipe body comprising an intermediate portion in a length direction and a bent portion formed at the intermediate portion; a plurality of adsorbing members that fill the pipe body and adsorb the fuel boil-off gas in gas discharged from the canister to the atmosphere; and at least one support member provided within the pipe body and supporting an inner diameter of the pipe body, wherein the at least one support member is disposed at the bent portion.

9 Claims, 16 Drawing Sheets

(52) U.S. Cl.
CPC .................. *B01D 2257/702* (2013.01); *B01D 2259/4516* (2013.01); *B01D 2259/4566* (2013.01)

(56) References Cited

U.S. PATENT DOCUMENTS

| | | | |
|---|---|---|---|
| 7,896,022 | B2 | 3/2011 | Benjey |
| 2011/0214572 | A1 | 9/2011 | Hasegawa et al. |
| 2013/0263741 | A1 | 10/2013 | Mani et al. |
| 2015/0275727 | A1 | 10/2015 | Hiltzik et al. |
| 2018/0274490 | A1 | 9/2018 | Honjo |
| 2020/0147586 | A1 | 5/2020 | Ruettinger et al. |
| 2021/0302262 | A1 | 9/2021 | Kishi et al. |

FOREIGN PATENT DOCUMENTS

| | | | | |
|---|---|---|---|---|
| JP | 2004278556 | A | | 10/2004 |
| JP | 2013164018 | A | * | 8/2013 |
| JP | 2015155246 | A | * | 8/2015 |
| JP | 2019183708 | A | | 10/2019 |
| JP | 6636600 | B2 | | 1/2020 |
| WO | 97033765 | A1 | | 9/1997 |

OTHER PUBLICATIONS

Extended European Search Report from corresponding Application No. 23766631.8 mailed on Mar. 2, 2026, 8 pages.

* cited by examiner

VEHICLE PIPE MEMBER AND METHOD FOR MANUFACTURING THE SAME

CROSS-REFERENCE TO RELATED APPLICATION

This application is based upon and claims the benefit of priority from Japanese Patent Application No. 2022-036344 filed with the Japan Patent Office on Mar. 9, 2022, the entire disclosure of which is incorporated herein by reference.

TECHNICAL FIELD

The present disclosure relates to a vehicle pipe member and a method for manufacturing the same.

BACKGROUND ART

Conventionally, a vehicle includes a canister that adsorbs fuel boil-off gas in a fuel tank. To prevent the breakthrough gas from the canister, a structure including an auxiliary canister filled with an adsorbent and open to the atmosphere is known (see Patent Literature 1: JP 6017167 B2, Patent Literature 2: JP 2020-023973 A, Patent Literature 3: JP 2020-532670 A, Patent Literature 4: JP 6636600 B2, and Patent Literature 5: JP 5587217 B2, for example).

SUMMARY

It is expected that the emission regulation of the fuel boil-off gas will become stricter, and accordingly, it is necessary to suppress the emission amount of the fuel boil-off gas. In addition, in a hybrid vehicle with an engine and a motor combined, the purge amount is small, which requires further measures against the breakthrough gas. However, conventional measures against the breakthrough gas use the canister and the auxiliary canister together, which requires the layout of the system to be devised. In particular, a small vehicle has limited space around the tank due to balancing a cabin and a luggage room. This makes it difficult to increase the size of an existing canister to improve its capacity and/or to use the auxiliary canister together. That is, it is necessary to suppress the emission amount of the fuel boil-off gas without the need to change or devise the system layout.

The present disclosure has been made in view of the above issues, and an object of the present invention is to provide a vehicle pipe member and a method for manufacturing the vehicle pipe member capable of suppressing the emission amount of the fuel boil-off gas without the need to change or devise the system layout.

To achieve the above object, a vehicle pipe member is provided. The vehicle pipe member includes a first end connected to a canister that adsorbs fuel boil-off gas in a fuel tank; a second end open to an atmosphere; a pipe body including an intermediate portion in a length direction and a bent portion formed at the intermediate portion; a plurality of adsorbing members that fill the pipe body to adsorb the fuel boil-off gas in gas discharged from the canister to the atmosphere; and at least one support member that is provided within the pipe body to support an inner diameter of the pipe body. The at least one support member is disposed at the bent portion.

To achieve the above object, a method for manufacturing a vehicle pipe member is provided. The vehicle pipe member includes a first end connected to a canister that adsorbs fuel boil-off gas in a fuel tank and a second end open to an atmosphere. The method includes a first step for disposing a plurality of adsorbing members and at least one support member within a pipe body having a straight pipe shape, the plurality of adsorbing members adsorbing the fuel boil-off gas in gas discharged from the canister to the atmosphere, and the at least one support member supporting an inner diameter of the pipe body; and a second step for forming a bent portion of the pipe body by bending the pipe body at a location where the at least one support member is disposed.

DETAILED DESCRIPTION

Figure 1:
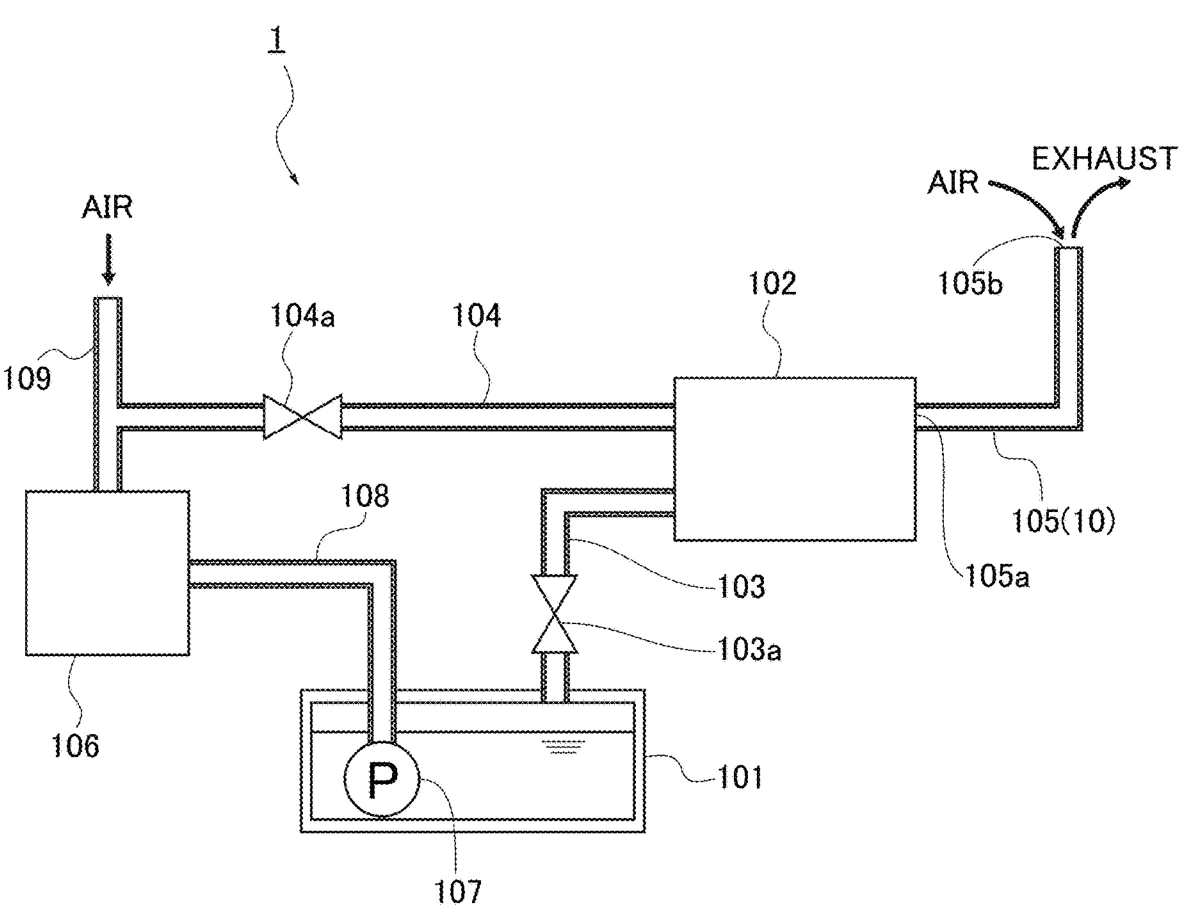
FIG. 1 is a schematic diagram of a fuel system of a vehicle including a vehicle pipe member of a first embodiment.

A vehicle pipe member and a method for manufacturing the same according to the present disclosure will be described with reference to first to third embodiments illustrated in the drawings.

First Embodiment

As illustrated in FIG. 1, a vehicle pipe member 10 of a first embodiment is applied to a system for suppressing fuel boil-off gas generated by the evaporation of fuel for a vehicle (hereinafter, referred to as a "fuel boil-off gas suppression system 1").

The fuel boil-off gas suppression system 1 includes a fuel tank 101, a canister 102, a vapor pipe 103, a purge pipe 104, and an atmosphere open pipe 105.

The fuel tank 101 is configured to store fuel which is supplied to an engine 106. The fuel in the fuel tank 101 is suctioned by a pump 107 and is supplied to the engine 106 through a fuel supply pipe 108.

The canister 102 is filled with an adsorbent such as activated carbon that adsorbs the fuel boil-off gas, and the adsorbent adsorbs the fuel boil-off gas to prevent the fuel boil-off gas from being released into the atmosphere. The canister 102 desorbs (purges) the fuel from the adsorbent by the suctioned air and supplies the fuel to the engine 106. Note that the adsorbent has an allowable amount for adsorption of the fuel boil-off gas, and adsorption and purge of the fuel boil-off gas can be repeatedly performed.

The vapor pipe 103 is configured to connect the fuel tank 101 and the canister 102. The fuel boil-off gas generated in the fuel tank 101 is supplied to the canister 102 through the vapor pipe 103. The vapor pipe 103 is provided with a cutoff valve 103*a*. The cutoff valve 103*a* is opened and closed to control the introduction of the fuel boil-off gas from the fuel tank 101 into the vapor pipe 103. The cutoff valve 103*a* is opened when the pressure in the fuel tank 101 increases and is closed when the pressure in the fuel tank 101 decreases.

The purge pipe 104 is configured to connect the canister 102 and an intake pipe 109 which is configured to allow air flowing into the engine 106. The fuel boil-off gas purged by the canister 102 flows into the intake pipe 109 through the purge pipe 104 and is supplied to the engine 106 together with the air flowing through the intake pipe 109. The purge pipe 104 is provided with a purge valve (vacuum switching valve) 104*a*. The purge valve 104*a* is opened and closed according to an engine load and/or a water temperature to control the introduction of the fuel boil-off gas into the purge pipe 104.

The atmosphere open pipe 105 includes a first end 105*a* and a second end 105*b*. The first end 105*a* is connected to the canister 102 and the second end 105*b* is open to the atmosphere. When an allowable adsorption amount of the fuel boil-off gas has been exceeded in the canister 102, the fuel boil-off gas that has not been adsorbed is discharged to the atmosphere through the atmosphere open pipe 105 as breakthrough gas (exhaust gas). When the engine 106 is operated, the air flowing through the intake pipe 109 is suctioned into the engine 106, and a negative pressure is generated in the intake pipe 109. At this time, opening the purge valve 104*a* allows the gas to flow from the purge pipe 104 into the intake pipe 109 toward the engine 106, generating a negative pressure in the purge pipe 104. Then, the negative pressure generated in the purge pipe 104 draws air from the atmosphere into the atmosphere open pipe 105 through the canister 102, causing the air to flow into the atmosphere open pipe 105. Subsequently, the air that has flowed into the atmosphere open pipe 105 enters the canister 102, and, together with the negative pressure in the canister 102, causes the fuel to desorb from the adsorbent. That is, gas (exhaust gas) discharged from the canister 102 and air to be purged by the canister 102 flow through the atmosphere open pipe 105.

The vehicle pipe member 10 is applied as the atmosphere open pipe 105 of the fuel boil-off gas suppression system 1 in which the first end 105*a* (first pipe end 11*a*) is connected to the canister 102 and the second end 105*b* (second pipe end 11*b*) is open to the atmosphere.

Figure 2:
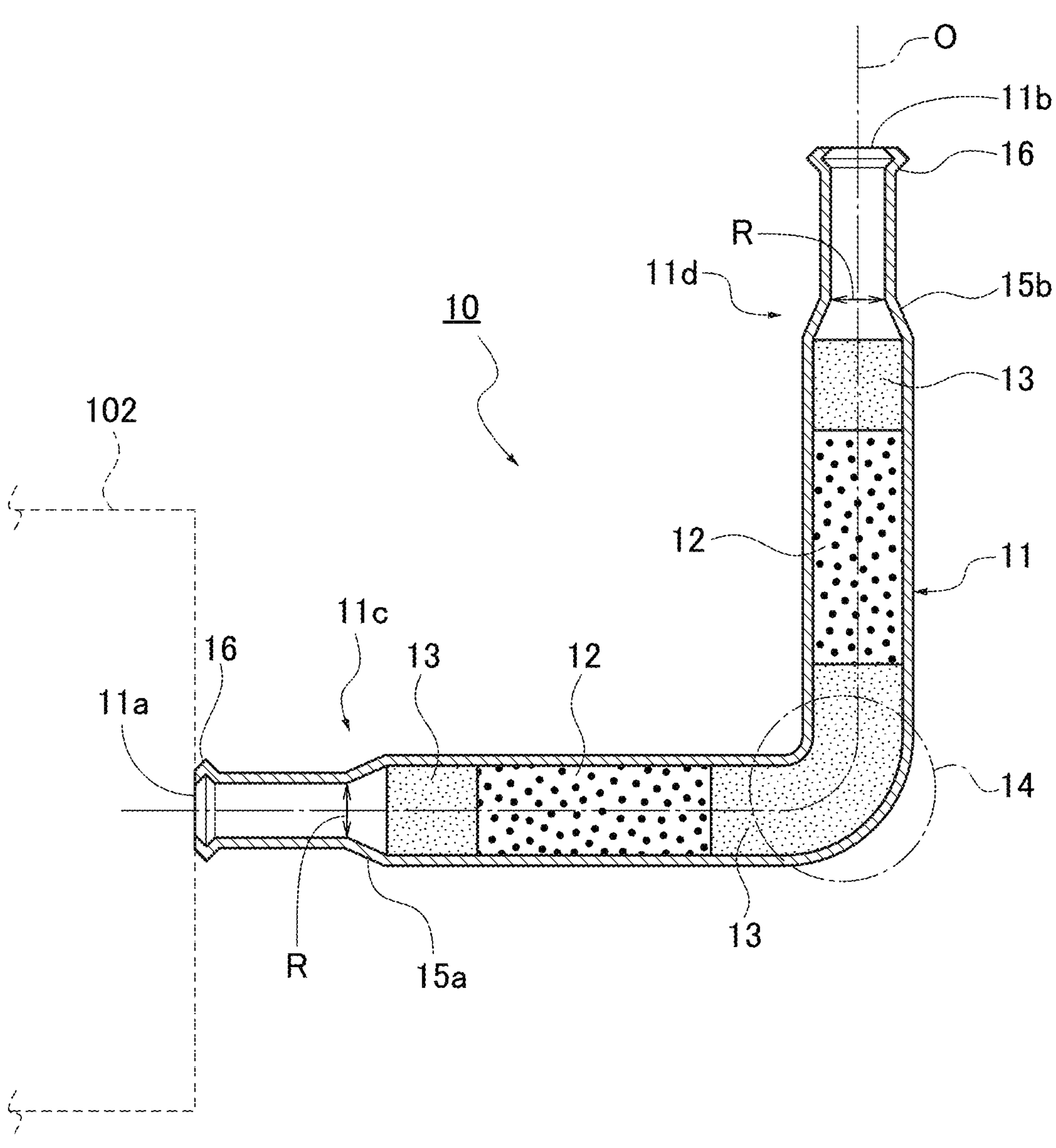
FIG. 2 is a cross-sectional view illustrating the vehicle pipe member of the first embodiment.

As illustrated in FIG. 2, the vehicle pipe member 10 includes a pipe body 11, adsorbing members 12, and support members 13.

The pipe body 11 is made of metal or resin and includes open pipe ends 11*a*, 11*b*. The pipe body 11 is a bent pipe which includes a bent portion 14 at an intermediate portion of the pipe body 11 in a length direction. Further, the pipe body 11 includes a first end portion 11*c* and a second end portion 11*d*. A first small diameter portion 15*a* is formed at the first end portion 11*c* and a second small diameter portion 15*b* is formed at the second end portion 11*d*. Furthermore, the pipe body 11 includes large diameter portions 16 respectively formed at the peripheral edges of the pipe ends 11*a*, 11*b*.

The bent portion 14 is a portion that changes the direction of a pipe axis O of the pipe body 11. In the bent portion 14 of the first embodiment, the direction of the pipe axis O is changed by 90° as viewed from the direction illustrated in FIG. 2.

The first small diameter portion 15*a* and the second small diameter portion 15*b* each have an inner diameter smaller than an inner diameter of the intermediate portion. The inner diameter of the first small diameter portion 15*a* gradually decreases toward the first pipe end 11*a*. Also, the inner diameter of the second small diameter portion 15*b* gradually decreases toward the second pipe end 11*b*. Here, minimum inner diameter dimensions R of the first and second small diameter portions 15*a*, 15*b* are set such that ventilation resistance of gas passing through the pipe body 11 does not significantly deteriorate. That is, the minimum inner diameter dimensions R of the first and second small diameter portions 15*a*, 15*b* are set such that gas smoothly flows through the pipe body 11.

In the first embodiment, the outer diameter of the pipe body 11 also gradually decreases toward the pipe ends 11*a*, 11*b* similar to the inner diameters in the first and second small diameter portions 15*a*, 15*b*. Furthermore, the dimensions of the inner and outer diameters are constant from the first small diameter portion 15*a* to the first large diameter portion 16. Also, the dimensions of the inner and outer diameters are constant from the second small diameter portion 15*b* to the second large diameter portion 16.

Each of the large diameter portions 16 protrudes outward in a pipe radial direction formed by bulge processing, bead processing, spool processing, or the like on the pipe ends 11*a*, 11*b*. Note that the large diameter portions 16 may not be formed.

The adsorbing members 12 fill the pipe body 11 and adsorb the fuel boil-off gas (breakthrough gas) in gas (exhaust gas) when the gas (exhaust gas) is discharged from the canister 102 to the atmosphere. The adsorbing member 12 is made of, for example, activated carbon. The adsorbing member 12 is formed into a disk-shaped (circular) pellet corresponding to the dimension of the inner diameter of the pipe body 11.

The support members 13 are provided within the pipe body 11 to support the pipe body 11 from the inside and the inner diameter of the pipe body 11. In addition, the support member 13 has elasticity capable of expanding and contracting at least along the pipe axis O. The support member 13 of the first embodiment is formed of a material such as a cylindrical urethane foam material and has elasticity capable of expanding and contracting in the pipe axis O direction and the pipe radial direction. The outer diameter of the support member 13 is set to a size that contacts the inner peripheral surface of the pipe body 11.

The adsorbing members 12 and the support members 13 are disposed between the first small diameter portion 15*a* and the second small diameter portion 15*b*. The support members 13 are disposed at the bent portion 14 and the end portions 11*c*, 11*d* of the pipe body 11, respectively.

The adsorbing member 12 is disposed between the support member 13 at the first end portion 11*c* of the pipe body 11 and the support member 13 at the bent portion 14. Further, the adsorbing member 12 is disposed between the support member 13 at the second end portion 11*d* of the pipe body 11 and the support member 13 at the bent portion 14. That is, the adsorbing member 12 and the support member 13 are alternately arranged along the pipe axis O within the pipe body 11.

Next, a method for manufacturing the vehicle pipe member 10 of the first embodiment will be described.

The method for manufacturing the vehicle pipe member 10 of the first embodiment includes a pre-step, a first step, an intermediate step, and a second step.

Figure 3A:
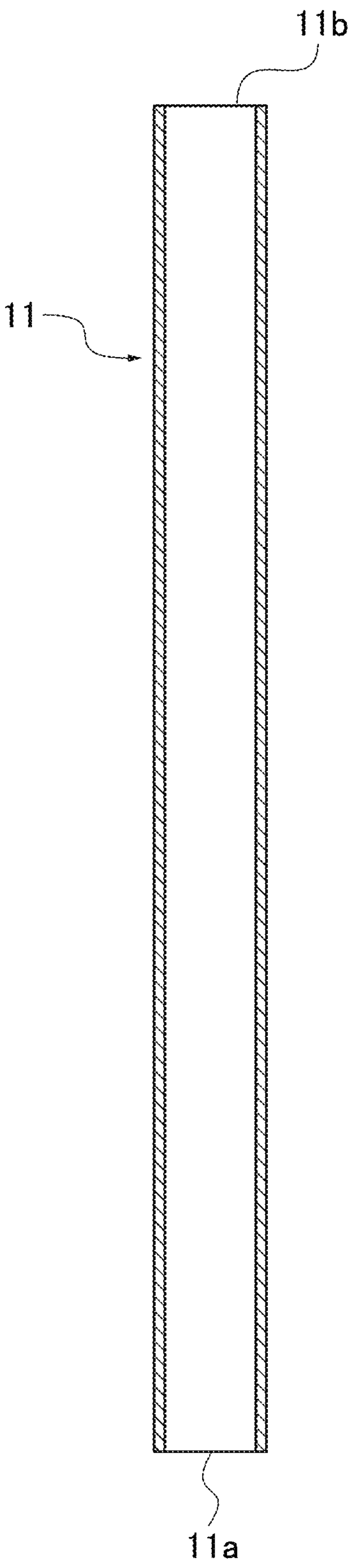
FIG. 3A is an explanatory view illustrating a pre-step in a method for manufacturing the vehicle pipe member of the first embodiment and a pipe body before processing.
Figure 3B:
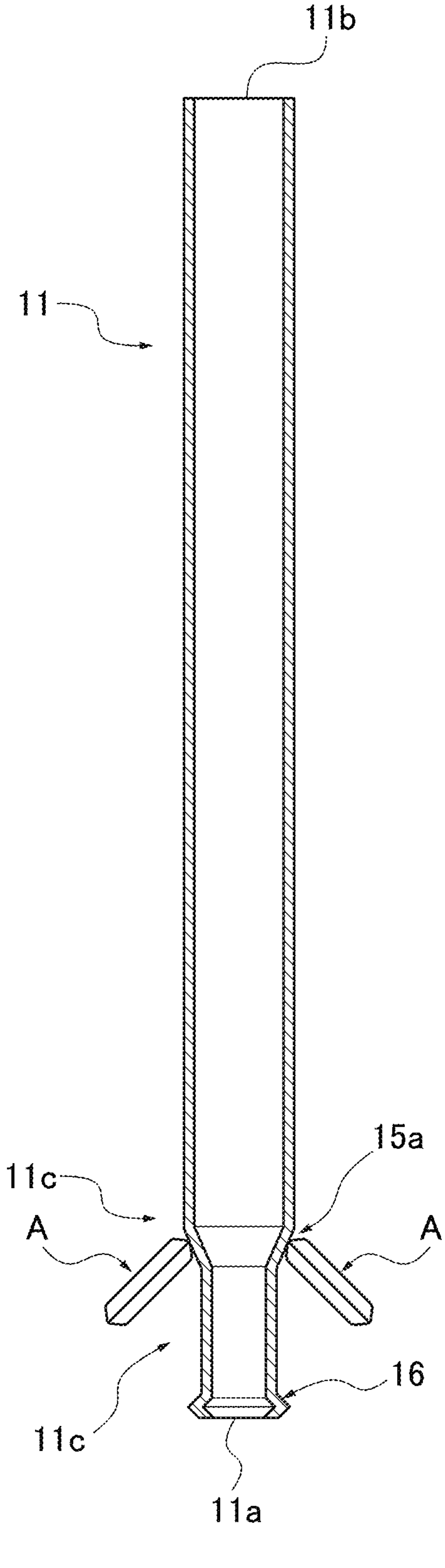
FIG. 3B is an explanatory view illustrating the pre-step in the method for manufacturing the vehicle pipe member of the first embodiment and the pipe body with a first small diameter portion.

The pre-step is a step before the first step. In the pre-step, the inner diameter of the first end portion 11*c* of the pipe body 11 is reduced to be smaller than the inner diameter of the intermediate portion of the pipe body 11 and the first small diameter portion 15*a* is formed at the first end portion 11*c* of the pipe body 11. First, in the pre-step, as illustrated in FIG. 3A, the pipe body 11 having a straight pipe shape with the pipe ends 11*a*, 11*b* open is set. Next in the pre-step, as illustrated in FIG. 3B, the first end portion 11*c* of the pipe body 11 is subjected to spinning processing for deforming the pipe body 11 by, for example, pressing a roller-shaped jig A against the pipe body 11, and the diameter of the first end portion 11*c* is reduced to form the first small diameter portion 15*a*. It is preferable that a pipe contraction ratio of the pipe body 11 is set to such an extent that does not cause significant deterioration in the ventilation resistance in the pipe body 11. In addition, in the pre-step, the diameter of the first pipe end 11*a* is expanded by bulge processing or similar processing, and the large diameter portion 16 is formed.

Figure 4A:
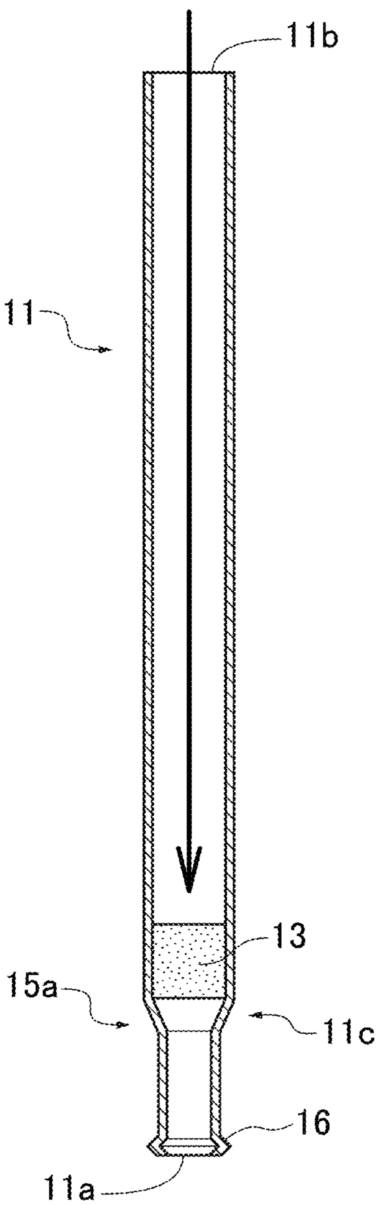
FIG. 4A is an explanatory view illustrating a first step in the method for manufacturing the vehicle pipe member of the first embodiment and a state in which a support member is disposed in a first end portion of the pipe body.
Figure 4B:
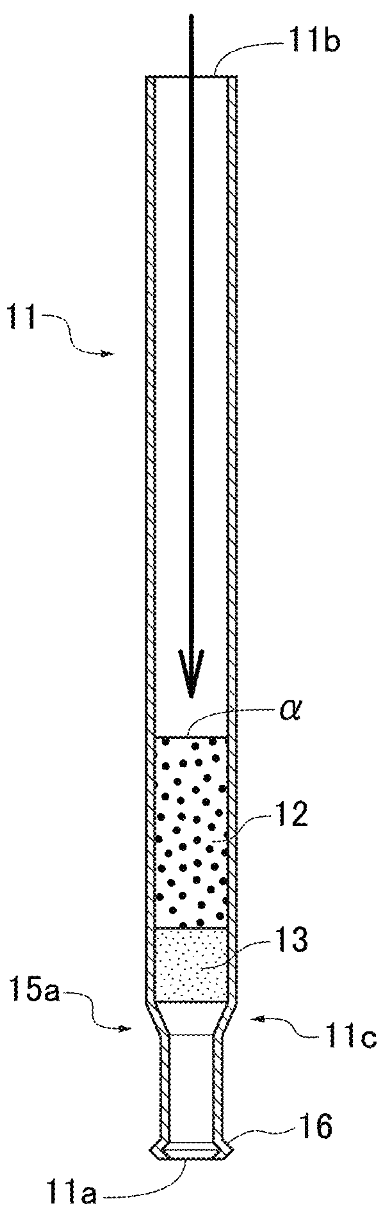
FIG. 4B is an explanatory view illustrating the first step in the method for manufacturing the vehicle pipe member of the first embodiment and a state in which the support member and an adsorbing member are alternately arranged.

The first step is a step after the pre-step. In the first step, the adsorbing member 12 and the support member 13 are alternately arranged within the pipe body 11, which has a straight pipe shape including the first small diameter portion 15*a* at the first end portion 11*c*. That is, in the first step, first, as illustrated in FIG. 4A, the support member 13 is introduced into the pipe body 11 from the second pipe end 11*b* which has not been processed yet. The support member 13 is formed in a cylindrical shape having an outer diameter determined in advance according to the inner diameter of the pipe body 11. Next, in the first step, air is injected into the pipe body 11, and the support member 13 is moved by the force of the air until it comes into contact with the first small diameter portion 15*a*. Subsequently, in the first step, as illustrated in FIG. 4B, the adsorbing member 12 is introduced into the pipe body 11 from the second pipe end 11*b*. The adsorbing member 12 is also moved within the pipe body 11 by the air injection until it comes into contact with the support member 13. A terminal position a of the adsorbing member 12 is adjusted by an input amount of the adsorbing member 12.

Figure 4C:
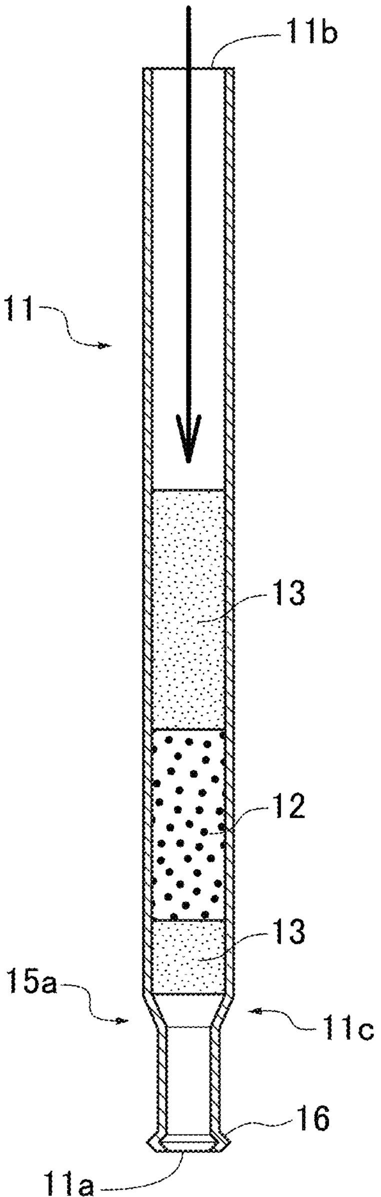
FIG. 4C is an explanatory view illustrating the first step in the method for manufacturing the vehicle pipe member of the first embodiment and a state in which the support members and the adsorbing member are alternately arranged.
Figure 4D:
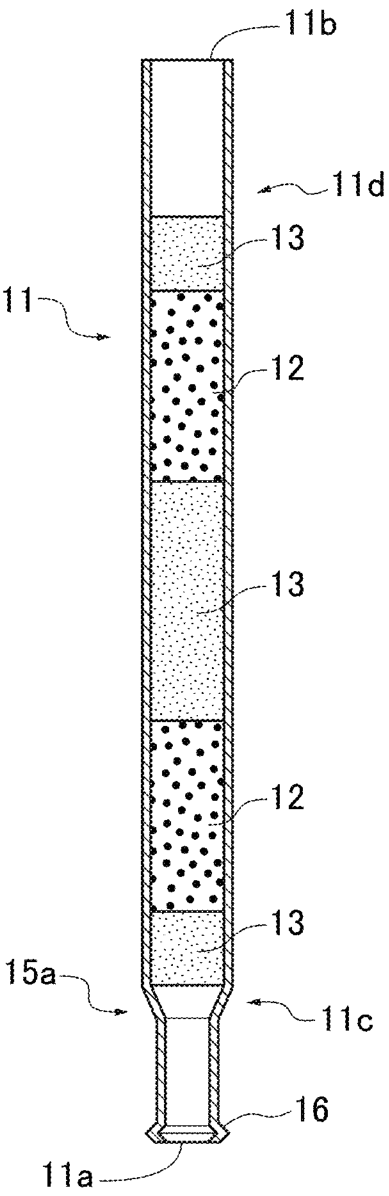
FIG. 4D is an explanatory view illustrating the first step in the method for manufacturing the vehicle pipe member of the first embodiment and a state in which the second end portion of the pipe body is filled with the support member.

After introducing the adsorbing member 12, the support member 13 is introduced into the pipe body 11 again as illustrated in FIG. 4C. Then, the support member 13 is moved by the air injection until it comes into contact with the adsorbing member 12. Thereafter, as illustrated in FIG. 4D, the adsorbing member 12 and the support members 13 are alternately introduced into the pipe body 11 until the support member 13 is disposed at the second end portion 11*d* of the pipe body 11.

Figure 5:
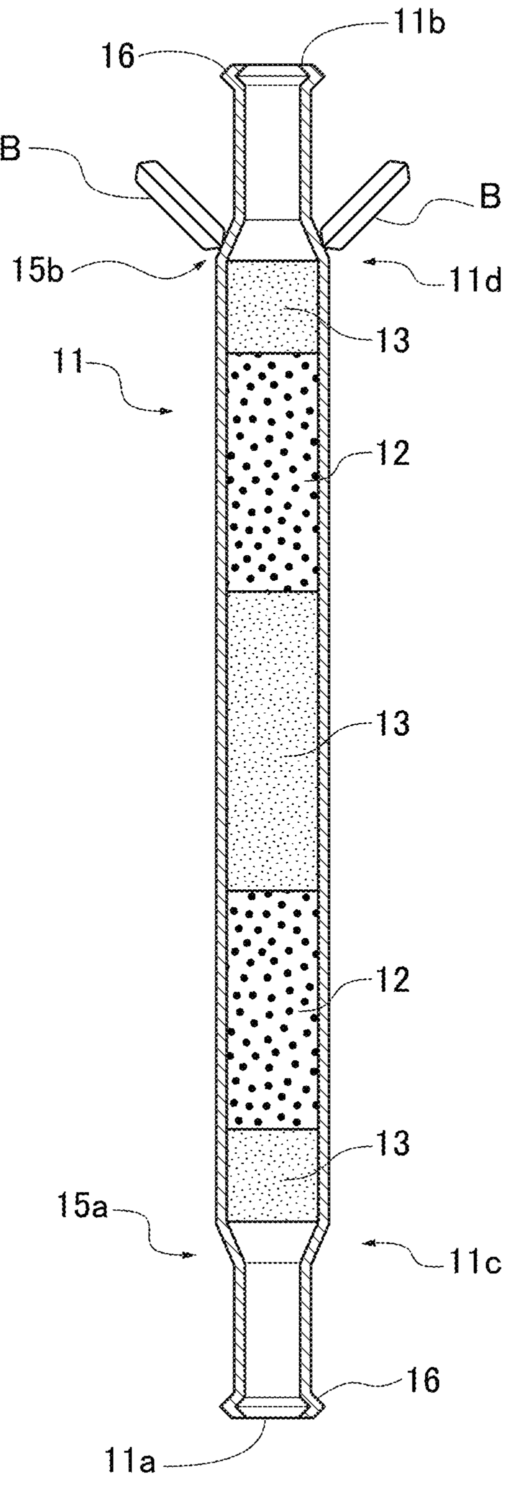
FIG. 5 is an explanatory view illustrating an intermediate step in the method for manufacturing the vehicle pipe member of the first embodiment.

The intermediate step is a step after the first step. In the intermediate step, the inner diameter of the second end portion 11*d* of the pipe body 11 is reduced to be smaller than the inner diameter of the intermediate portion of the pipe body 11 and the second small diameter portion 15*b* is formed at the second end portion 11*d* of the pipe body 11. That is, in the intermediate step, as illustrated in FIG. 5, the second end portion 11*d* of the pipe body 11 in which the adsorbing members 12 and the support members 13 are disposed is subjected to spinning processing for deforming the pipe body 11 by, for example, pressing a roller-shaped jig B against the pipe body 11, and the diameter of the second end portion 11*d* is reduced to form the second small diameter portion 15*b*. In the intermediate step, the diameter of the second pipe end 11*b* is expanded by performing bulge processing or similar processing, and the large diameter portion 16 is formed.

Figure 6:
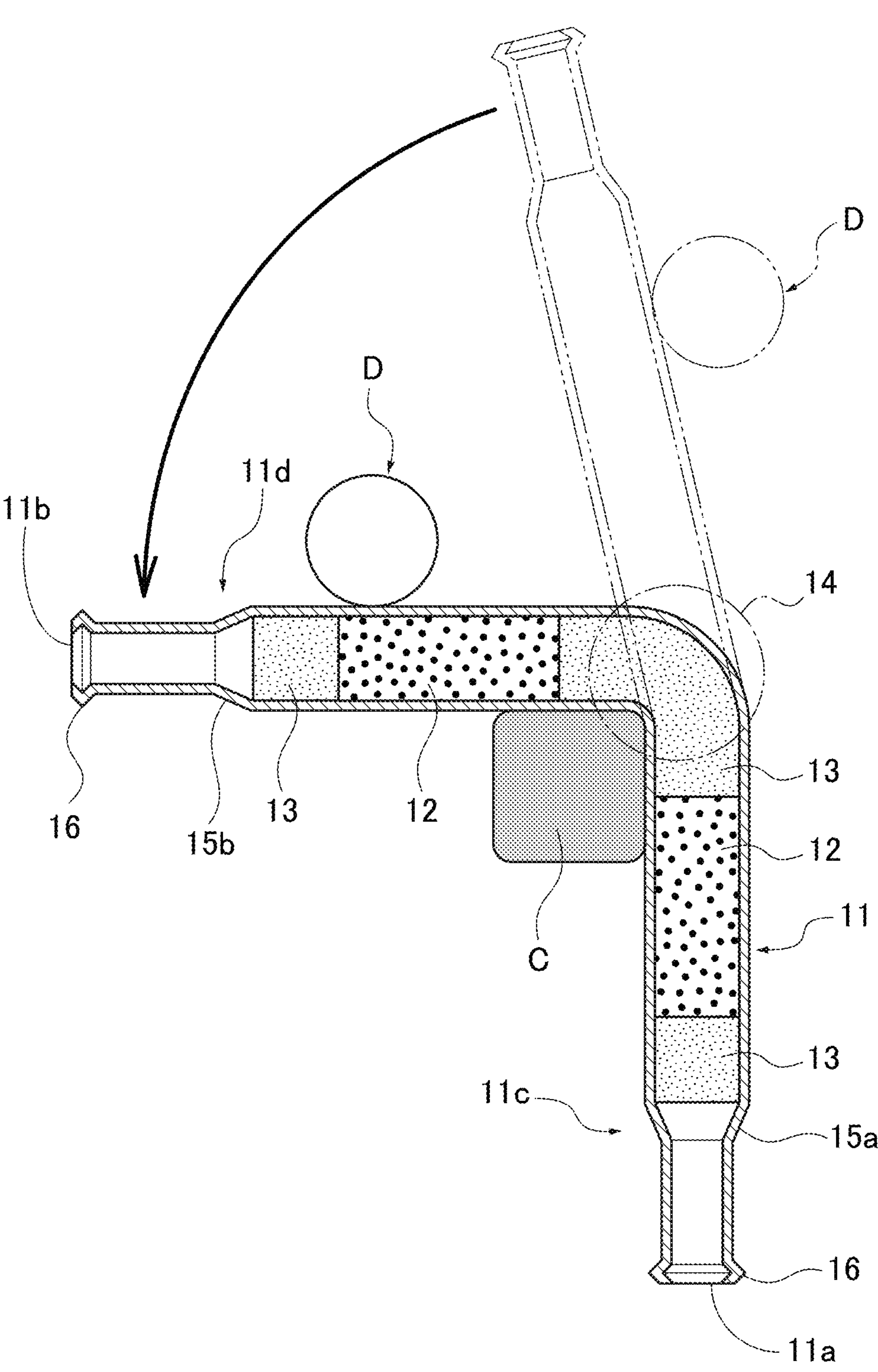
FIG. 6 is an explanatory view illustrating a second step in the method for manufacturing the vehicle pipe member of the first embodiment.

The second step is a step after the intermediate step. In the second step, the pipe body 11 is bent at the position where the support member 13 is disposed to form the bent portion 14 at the intermediate portion of the pipe body 11 in the length direction. That is, in the second step, as illustrated in FIG. 6, first, the pipe body 11 including the second small diameter portion 15*b* is supported by a support jig C. The support jig C is brought into contact with a position where the support member 13 is disposed within the intermediate portion of the pipe body 11.

Next, a pressing jig D is brought into contact with the second end portion 11*d* of the pipe body 11. Then, the second end portion 11*d* of the pipe body 11 is pressed with the pressing jig D to bend the pipe body 11. At this time, the intermediate portion of the pipe body 11 is supported by the support jig C, and accordingly, the intermediate portion of the pipe body 11 is bent to form the bent portion 14.

Hereinafter, the operation of the vehicle pipe member 10 of the first embodiment and the method for manufacturing the same will be described.

At present, the environmental load caused by boil-off gas generated when fuel vapor in a fuel tank is released to the atmosphere through a breakthrough canister (diurnal breathing loss (DBL)) has become a problem, and DBL regulation is in progress. Therefore, a vehicle that uses gasoline as fuel needs to suppress an emission amount of fuel boil-off gas and satisfy a regulation value.

Therefore, for example, it is conceivable to increase the processing capacity (adsorption amount of fuel boil-off gas) of the canister 102 by enlarging the canister 102 of the fuel boil-off gas suppression system 1 mounted on the vehicle or using an auxiliary canister together.

In addition, it is also conceivable to increase the adsorption amount of the fuel boil-off gas by, for example, improving the performance of an adsorbent that fills the canister 102. Furthermore, it is also conceivable to provide an electric heater on the canister 102 to promote the separation of an adsorbed fuel component by heating it using the electric heater or to improve a method for arranging the adsorbent, thereby increasing the purging efficiency of the canister 102 and suppressing the emission of the fuel boil-off gas.

However, when the canister 102 is increased in size or an auxiliary canister is used together, it is necessary to change the designs of the canister 102 and the auxiliary canister and newly consider the system layout and the like. Even when the performance of the adsorbent or the purge efficiency of the canister 102 is improved, it is necessary to change the specification or the structure of the canister 102. Therefore, it is necessary to change or devise the system layout, and the emission of the fuel boil-off gas cannot be easily suppressed.

On the other hand, the vehicle pipe member 10 of the first embodiment is used as the atmosphere open pipe 105 of the fuel boil-off gas suppression system 1 in which the first pipe end 11*a* is connected to the canister 102 and the second pipe end 11*b* is open to the atmosphere. The vehicle pipe member 10 includes the pipe body 11 having the bent portion 14 at the intermediate portion of the pipe body 11 in the length direction, the adsorbing members 12 that fill the pipe body 11, and the support members 13 provided within the pipe body 11.

Therefore, when the gas (exhaust gas) that passed through the canister 102 is discharged into the atmosphere, the gas (exhaust gas) passes through the vehicle pipe member 10 which is the atmosphere open pipe 105, so that the vehicle pipe member 10 causes the adsorbing members 12 to adsorb the fuel boil-off gas (breakthrough gas) contained in the gas.

That is, the fuel boil-off gas suppression system 1 uses the vehicle pipe member 10 of the first embodiment as the atmosphere open pipe 105, so that the atmosphere open pipe 105 absorbs the fuel boil-off gas contained in the gas (exhaust gas) from the canister 102, thereby preventing the fuel boil-off gas from being discharged to the atmosphere. As a result, it is possible to increase the adsorption amount of the fuel boil-off gas without designing a new system layout or devising the system layout. When the vehicle pipe member 10 of the first embodiment is used, it is not necessary to change or devise the system layout, and thus the vehicle pipe member 10 of the first embodiment can be retrofitted to the existing fuel boil-off gas suppression system 1.

In the vehicle pipe member 10 of the first embodiment, the support member 13 that supports the inner diameter of the pipe body 11 is disposed at the bent portion 14.

Accordingly, when the bent portion 14 is formed in the pipe body 11, it is possible to prevent the adsorbing members 12 within the pipe body 11 from being pulverized due to the deformation of the pipe body 11. When the adsorbing members 12 are pulverized, the volume of the adsorbing members 12 may decrease, which generates a gap within the pipe body 11. Then, the adsorbing members 12 are moved by the vibration of the traveling vehicle and rubbed against each other, so that the pulverization of the adsorbing members 12 is further promoted, thereby enlarging the gap within the pipe body 11. As a result, gas (exhaust gas) flowing from the canister 102 passes through the gap having small ventilation resistance, and a required function for absorbing the fuel boil-off gas may not be exhibited. The vehicle pipe member 10 of the first embodiment can prevent the pulverization of the adsorbing members 12 due to the deformation of the pipe body 11, and thus can suppress deterioration in the fuel boil-off gas adsorption function.

That is, the vehicle pipe member 10 of the first embodiment can adsorb the fuel boil-off gas (breakthrough gas) contained in the gas (exhaust gas) that passed through the canister 102 without changing or devising the system layout. As a result, it is possible to increase the adsorption amount of the fuel boil-off gas in the fuel boil-off gas suppression system 1 and suppress the emission amount of the fuel boil-off gas. Further, using the vehicle pipe member 10 of the first embodiment makes it possible to eliminate the necessity of installing an auxiliary canister depending on the adsorption capacity value of the fuel boil-off gas required for the fuel boil-off gas suppression system 1.

In addition, in the vehicle pipe member 10 of the first embodiment, the first small diameter portion 15*a* having an inner diameter smaller than the inner diameter of the intermediate portion of the pipe body 11 is formed at the first end portion 11*c* of the pipe body 11, and the second small diameter portion 15*b* having an inner diameter smaller than the inner diameter of the intermediate portion of the pipe body 11 is formed at the second end portion 11*d* of the pipe body 11. The adsorbing members 12 and the support members 13 are disposed between the first small diameter portion 15*a* and the second small diameter portion 15*b*.

Therefore, in the vehicle pipe member 10 of the first embodiment, when the adsorbing members 12 and the support members 13 are moved along the pipe axis O of the pipe body 11, the adsorbing members 12 and the support members 13 interfere with the first small diameter portion 15*a* or the second small diameter portion 15*b*. Therefore, the adsorbing members 12 and the support members 13 are positioned in the length direction, and the movements of the adsorbing members 12 and the support members 13 along the pipe axis O are regulated. As a result, the vehicle pipe member 10 of the first embodiment can suppress the pulverization of the adsorbing members 12 even when the vehicle travels and vibrates, which makes it difficult for gaps to be formed inside the pipe body 11. The vehicle pipe member 10 can suppress deterioration in the fuel boil-off gas adsorption function by the adsorbing members 12.

Further, in the vehicle pipe member 10 of the first embodiment, the support member 13 is disposed at the end portions 11*c*, 11*d* of the pipe body 11, respectively. The adsorbing member 12 is disposed between the support member 13 at the first end portion 11*c* of the pipe body 11 and the support member 13 at the bent portion 14 and between the support member 13 at the second end portion 11*d* of the pipe body 11 and the support member 13 at the bent portion 14.

As a result, in the vehicle pipe member 10 of the first embodiment, the adsorbing members 12 are sandwiched by the support members 13 and disposed within the pipe body 11. Therefore, the movement of the adsorbing members 12 along the pipe axis O is further suppressed, and the movement of the adsorbing members 12 due to the vibration of the traveling vehicle is suppressed, thereby further preventing the pulverization of the adsorbing members 12. The vehicle pipe member 10 can prevent the generation of a gap within the pipe body 11 and suppress deterioration in the fuel boil-off gas adsorption function.

In addition, in the vehicle pipe member 10 of the first embodiment, the support member 13 is formed of a urethane foam material having elasticity capable of expanding and contracting at least along the pipe axis O of the pipe body 11. In the vehicle pipe member 10, the support members 13 are disposed within the pipe body 11 in a contracted state, and accordingly, the contraction repulsive force of the support members 13 presses the adsorbing members 12 along the pipe axis O. Therefore, variations in the filling amount of the adsorbing members 12 can be adjusted by the deformation (expansion) of the support member 13, and the movement of the adsorbing members 12 can be suppressed to prevent wear of the adsorbing members 12 due to the vibration of the traveling vehicle. As a result, the vehicle pipe member 10 of the first embodiment can prevent the generation of a gap in the pipe body 11 and suppress deterioration in the fuel boil-off gas adsorption function.

The method for manufacturing the vehicle pipe member 10 of the first embodiment includes the first step (FIGS. 4A to 4D) for arranging the adsorbing members 12 and the support members 13 within the pipe body 11 which has a straight pipe shape, and the second step (FIG. 6) for bending the pipe body 11 at the position at which the support member 13 is arranged to form the bent portion 14 at the intermediate portion of the pipe body 11 in the length direction. That is, in the manufacturing method of the first embodiment, the adsorbing members 12 are disposed within the pipe body 11 in advance before bending the pipe body 11.

As a result, the adsorbing members 12 can be introduced into the pipe body 11 having a straight pipe shape, and the adsorbing members 12 formed into a disk-shaped pellet corresponding to the dimension of the inner diameter of the pipe body 11 can be standardized as a dedicated pellet for pipe bodies 11 each having a different inner diameter. Therefore, work time can be shortened and costs can be reduced.

When the adsorbing member 12 is introduced into the pipe body 11 in a state in which the bent portion 14 is formed at the intermediate portion of the pipe body 11 in the length direction, only the adsorbing member that is a granular pellet can be introduced thereinto, and the adsorbing member having a disk shape cannot be used. In addition, when the shape of the bent portion 14 is complicated, it is difficult to arrange the adsorbing members 12 and the support members 13 in the pipe body 11, and work may take time.

The method for manufacturing the vehicle pipe member 10 of the first embodiment includes, before the first step, the pre-step (FIG. 3B) for making the inner diameter of the first end portion 11*c* of the pipe body 11 smaller than the inner diameter of the intermediate portion of the pipe body 11 in the length direction to form the first small diameter portion 15*a* at the first end portion 11*c* of the pipe body 11.

Therefore, when the support member 13 is inserted into the pipe body 11 in the first step, the support member 13 can be positioned by the first small diameter portion 15*a* formed in advance. As a result, work efficiency can be improved.

Moreover, the method for manufacturing the vehicle pipe member 10 of the first embodiment includes, between the first step and the second step, the intermediate step (FIG. 5) for making the inner diameter of the second end portion 11*d* of the pipe body 11 smaller than the inner diameter of the intermediate portion of the pipe body 11 in the length direction to form the second small diameter portion 15*b* at the second end portion 11*d* of the pipe body 11.

As a result, before the second step, the adsorbing members 12 and the support members 13 introduced into the pipe body 11 can be positioned by the first small diameter portion 15*a* and the second small diameter portion 15*b*. Then, when the pipe body 11 is bent in the second step, the adsorbing members 12 and the support members 13 are prevented from being displaced along the pipe axis O, and the support member 13 can be accurately disposed at the bent portion 14.

Second Embodiment

A vehicle pipe member 20 of a second embodiment is an example in which adsorbing members 22 and a support member 23 are enclosed in a bag 28 (first bag).

Figure 7:
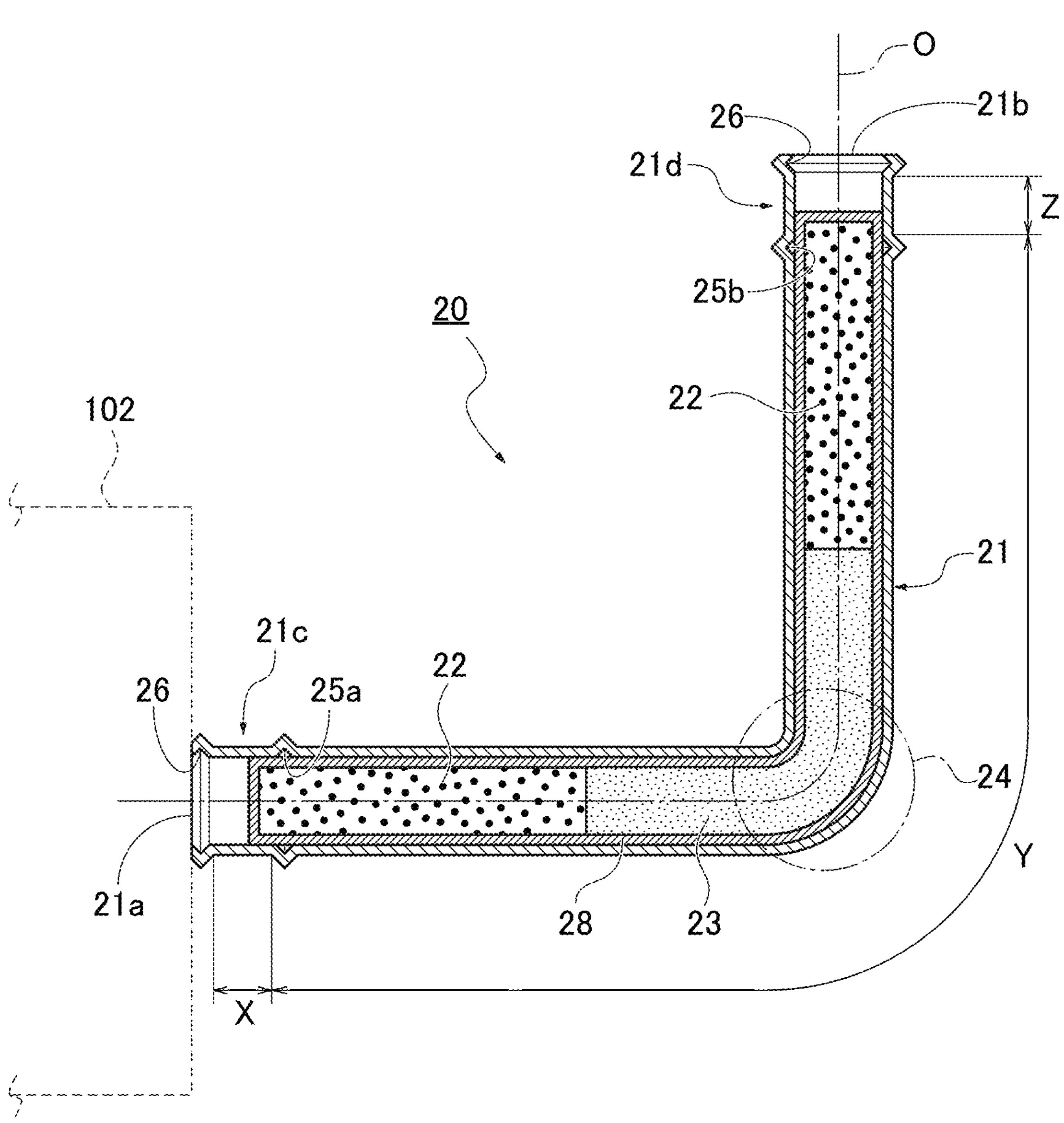
FIG. 7 is a cross-sectional view illustrating a vehicle pipe member of a second embodiment.

That is, as illustrated in FIG. 7, the vehicle pipe member 20 of the second embodiment includes a pipe body 21, the adsorbing members 22, the support member 23, and the bag 28.

The pipe body 21 is made of metal or resin similar to the first embodiment. The pipe body 21 includes open pipe ends 21*a*, 21*b* and a bent portion 24 formed at an intermediate portion of the pipe body 21 in the length direction. The bent portion 24 is configured to change the direction of the pipe axis O of the pipe body 21. In the bent portion 24 of the second embodiment, the direction of the pipe axis O is changed by 90° as viewed from the direction illustrated in FIG. 7.

Further, the pipe body 21 includes a first end portion 21*c* and a second end portion 21*d*. A first annular groove 25*a* is formed in an inner peripheral surface of the first end portion 21*c*, and a second annular groove 25*b* is formed in an inner peripheral surface of the second end portion 21*d*. Furthermore, the pipe body 21 of the second embodiment includes large diameter portions 26 at the peripheral edges of the pipe ends 21*a*, 21*b*, respectively.

The first annular groove 25*a* and the second annular groove 25*b* are indentations that are formed in the inner peripheral surface of the pipe body 21 and extend along the entire circumference in a circumferential direction. The large diameter portions 26 are portions protruding outward in the pipe radial direction along the circumferential direction of the pipe ends 21*a*, 21*b* over the entire circumference. The first annular groove 25*a*, the second annular groove 25*b*, and the large diameter portions 26 are formed in the pipe body 21 by bulge processing, bead processing, spool processing, or similar processing. In the second embodiment, to make a wall thickness of the pipe body 21 constant, annular protrusions are formed on the outer periphery of the pipe body 21 as the first annular groove 25*a* and the second annular groove 25*b* are formed. The first annular groove 25*a*, the second annular groove 25*b*, and the large diameter portions 26 may not be formed.

In the pipe body 21, a region between the first large diameter portion 26 and the first annular groove 25*a* is referred to as a "first end region X", a region between the first annular groove 25*a* and the second annular groove 25*b* is referred to as an "intermediate region Y", and a region between the second annular groove 25*b* and the second large diameter portion 26 is referred to as a "second end region Z". The inner diameter in the first end region X, the inner diameter in the intermediate region Y, and the inner diameter in the second end region Z are set to the same size. In addition, the outer diameter in the first end region X, the outer diameter in the intermediate region Y, and the outer diameter in the second end region Z are set to the same size. In the bent portion 24 formed in the intermediate region Y, the inner diameter and the outer diameter may be different from the inner diameters and the outer diameters of other portions due to the influence of bending of the pipe body 21.

The adsorbing members 22 fill the pipe body 21 and adsorb fuel boil-off gas (breakthrough gas) in gas (exhaust gas) discharged from the canister 102. The adsorbing member 22 is made of, for example, activated carbon. The adsorbing member 22 of the second embodiment has a fine particle shape such as a granular shape, a powder shape, and a fibrous shape.

The support member 23 is provided within the pipe body 21 and supports the pipe body 21 from the inside to support the inner diameter of the pipe body 21. The support member 23 has the same configuration as the support member 13 of the first embodiment, and accordingly, a detailed description thereof is omitted.

The bag 28 is a cylindrical bag that encloses the adsorbing members 22 and the support member 23. Both ends of the bag 28 are closed while the adsorbing members 22 and the support member 23 are enclosed within the bag 28. The bag 28 has air permeability that enables ventilation of gas (exhaust gas) discharged from the canister 102. The bag 28 has flexibility capable of following the deformation of the pipe body 21. Specifically, the bag 28 is preferably formed of a nonwoven fabric or a microporous film, and has heat resistance, flame retardancy, and the like.

The bag 28 receives the adsorbing member 22 in each end portion of the bag 28 in the length direction and the support member 23 in an intermediate portion of the bag 28 in the length direction. The total length of the bag 28 is shorter than the total length of the pipe body 21. It is preferable that the total length of the bag 28 is the same as the length or distance between plug members 27, which will be described later, when the plug members 27 are attached to both ends of the pipe body 21.

In the vehicle pipe member 20 of the second embodiment, the adsorbing members 22 and the support member 23 are enclosed in the bag 28 and disposed within the pipe body 21. At this time, the support member 23 is disposed at the bent portion 24, and the adsorbing members 22 are disposed between the bent portion 24 and the first end portion 21*c* of the pipe body 21 and between the bent portion 24 and the second end portion 21*d* of the pipe body 21, respectively. That is, the adsorbing member 22 and the support member 23 are alternately arranged along the pipe axis O inside the pipe body 21.

Next, a method for manufacturing the vehicle pipe member 20 of the second embodiment will be described.

The method for manufacturing the vehicle pipe member 20 of the second embodiment includes a pre-step, a first step, an intermediate step, and a second step.

Figure 8A:
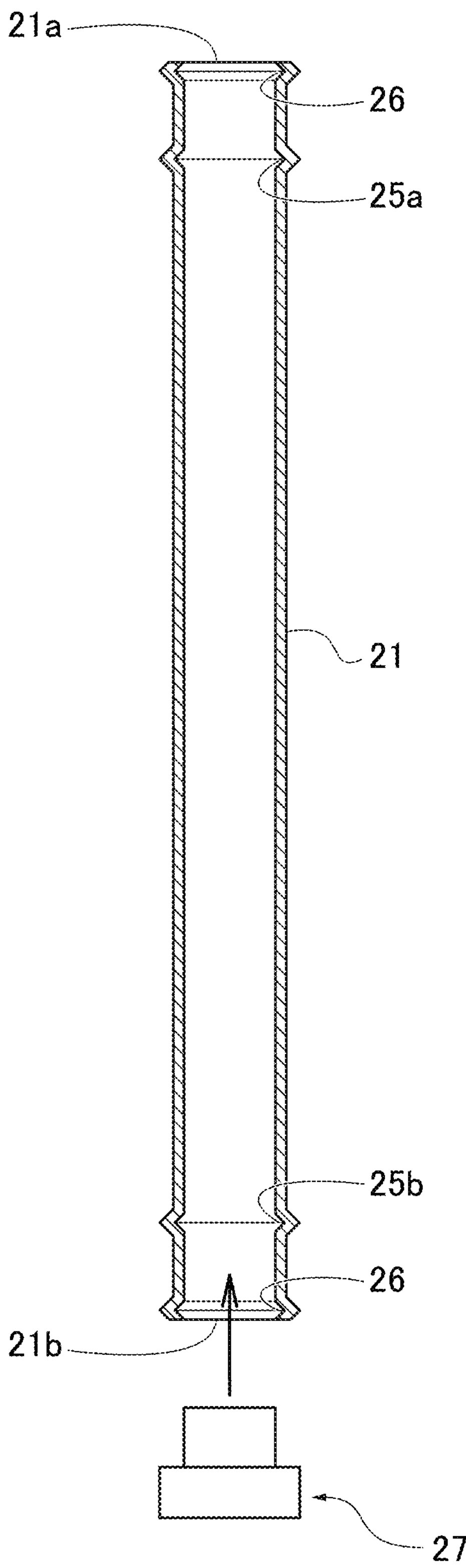
FIG. 8A is an explanatory view illustrating a pre-step in a method for manufacturing the vehicle pipe member of the second embodiment and a pipe body including a plug member attached to the second pipe end.

The pre-step is a step before the first step. In the pre-step of the second embodiment, a first pipe end 21*a* of the pipe body 21 is closed, and the adsorbing members 22 and the support member 23 are introduced in the bag 28. That is, in the pre-step of the second embodiment, first, as illustrated in FIG. 8A, the plug member 27 is attached to a second pipe end 21*b* of the pipe body 21 which has a straight pipe shape. The pipe body 21 is subjected to bulge processing or similar processing in advance to form the first annular groove 25*a*, the second annular groove 25*b*, and the large diameter portions 26. In addition, the plug member 27 is fixed to the pipe body 21 by being press-fitted into the pipe body 21 to block the second pipe end 21*b*.

Figure 8B:
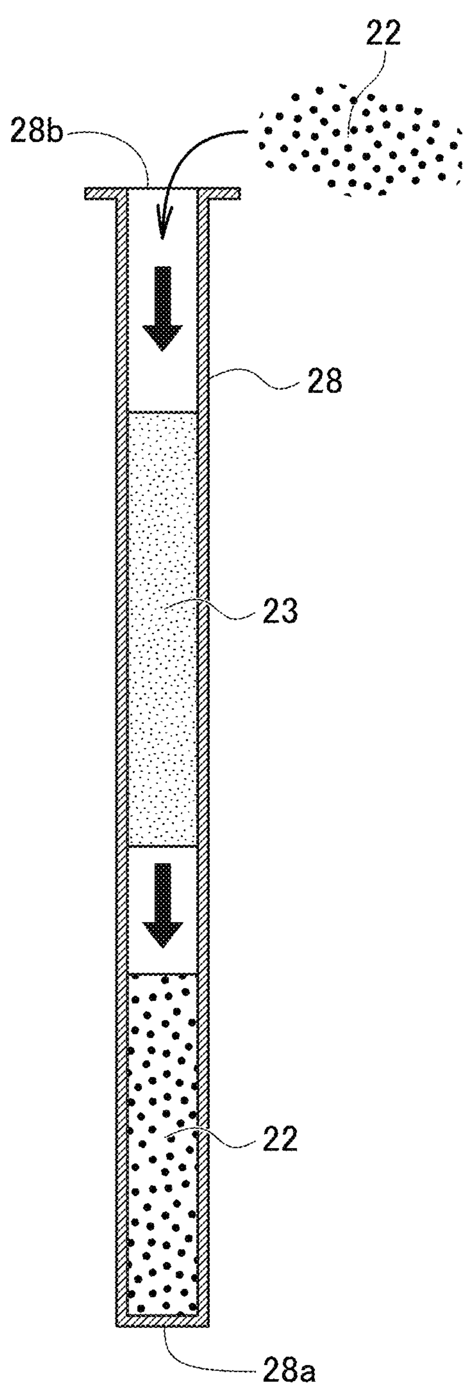
FIG. 8B is an explanatory view illustrating the pre-step in the method for manufacturing the vehicle pipe member of the second embodiment and a step for putting an adsorbing member and a support member into a bag.

In the pre-step of the second embodiment, as illustrated in FIG. 8B, the adsorbing members 22 and the support member 23 are alternately introduced and enclosed in the bag 28. A first end portion 28*a* of the bag 28 is closed in advance while a second end portion 28*b* is opened. Then, the adsorbing member 22, the support member 23, and the adsorbing member 22 are put into the bag 28 in this order from the second end portion 28*b*, which is open, and then the second end portion 28*b* is closed.

Figure 9:
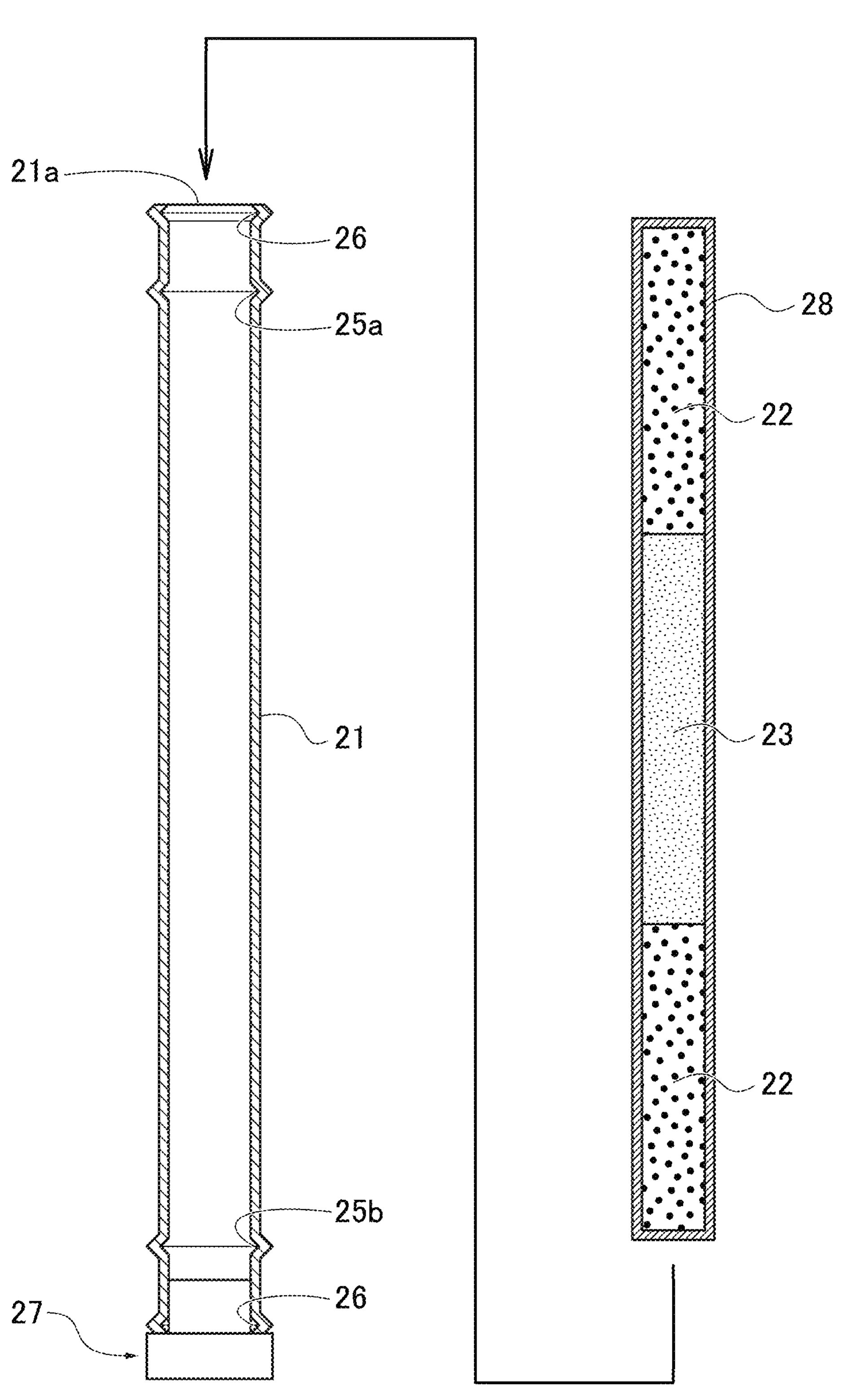
FIG. 9 is an explanatory view illustrating a first step in the method for manufacturing the vehicle pipe member of the second embodiment.

The first step is a step subsequent to the pre-step. In the first step, the adsorbing members 22 and the support member 23 are disposed within the pipe body 21 which has a straight pipe shape. In the second embodiment, the adsorbing members 22 and the support member 23 are enclosed in the bag 28 in the pre-step. Therefore, in the first step of the second embodiment, as illustrated in FIG. 9, the bag 28 enclosing the adsorbing members 22 and the support member 23 is inserted into the pipe body 21. That is, the adsorbing members 22 and the support member 23 are enclosed in the bag 28 and inserted into the pipe body 21. As a result, the adsorbing members 22 and the support member 23 are disposed within the pipe body 21 which has a straight pipe shape.

Figure 10:
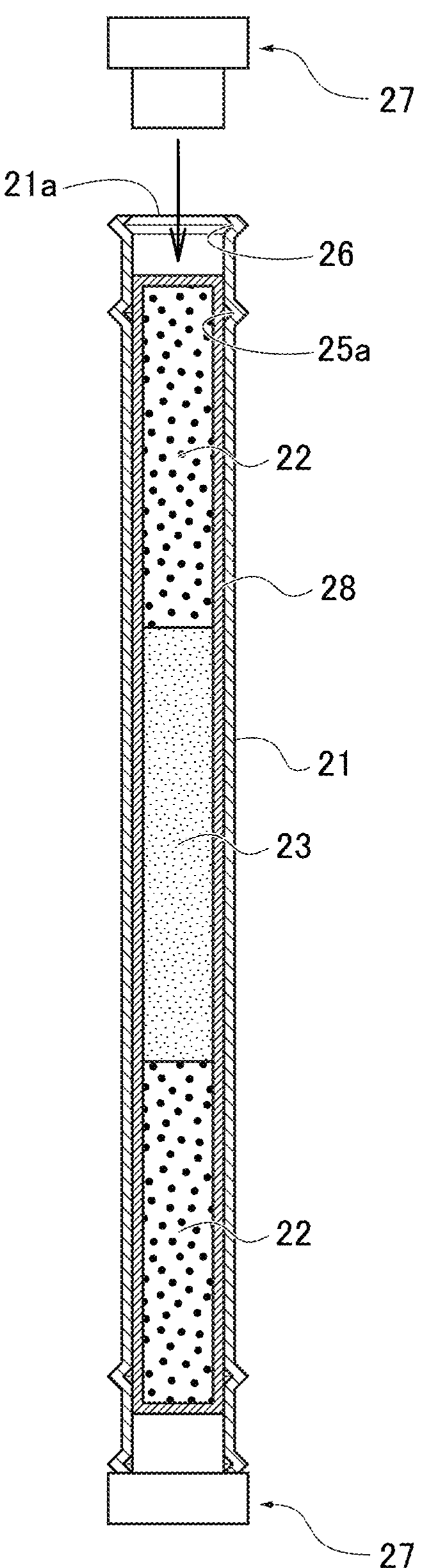
FIG. 10 is an explanatory view illustrating an intermediate step in the method for manufacturing the vehicle pipe member of the second embodiment.

The intermediate step is a step after the first step. In the intermediate step, the first pipe end 21*a* of the pipe body 21 is closed. That is, in the intermediate step of the second embodiment, as illustrated in FIG. 10, the plug member 27 is attached to the first pipe end 21*a* of the pipe body 21. The plug member 27 is press-fitted into the pipe body 21 to block the first pipe end 21*a*.

The second step is a step after the intermediate step. In the second step, the pipe body 21 is bent at the position where the support member 23 is disposed to form the bent portion 24 at the intermediate portion of the pipe body 21 in the length direction. The second step of the second embodiment is the same procedure as the second step of the first embodiment, and accordingly, the detailed description thereof is omitted. In the second step of the second embodiment, after the bent portion 24 is formed, the plug members 27 attached to the pipe ends 21*a*, 21*b* are all pulled out and removed from the pipe body 21.

Hereinafter, the operation of the vehicle pipe member 20 of the second embodiment and the method for manufacturing the same will be described.

In the vehicle pipe member 20 of the second embodiment, the adsorbing members 22 and the support member 23 are enclosed in the bag 28 and are disposed inside the pipe body 21 in a state of being enclosed in the bag 28. Therefore, the adsorbing members 22 and the support member 23 are integrated with each other by the bag 28. As a result, the pipe body 21 is bent in the second step and the bent portion 24 is formed, so that the positions of the adsorbing members 22 and the support member 23 are regulated.

That is, in the vehicle pipe member 20 of the second embodiment, the support member 23 is held or caught at the bent portion 24 of the pipe body 21, and the positional deviation of the support member 23 is regulated. Since the adsorbing members 22 are integrated with the support member 23 by the bag 28, regulating the positional deviation of the support member 23 regulates the positional deviations of the adsorbing members 22. As a result, in the vehicle pipe member 20 of the second embodiment, the adsorbing members 22 do not change the positions along the pipe axis O during use. As a result, unlike the first embodiment, it is unnecessary to perform terminal processing of the pipe body 21 to fix the adsorbing members 22 during use, that is, to form the first small diameter portion 15*a* in the pre-processing of the first embodiment and to form the second small diameter portion 15*b* in the intermediate step of the first embodiment.

As a result, the vehicle pipe member 20 of the second embodiment can be more easily manufactured than the method for manufacturing the vehicle pipe member 10 of the first embodiment. In addition, the vehicle pipe member 20 of the second embodiment does not require equipment for forming the first and second small diameter portions 15*a*, 15*b*, and an increase in cost can be suppressed.

In addition, the vehicle pipe member 20 of the second embodiment does not require the support member 23 to be disposed at the end portions 21*c*, 21*d*, and accordingly, it is possible to dispose more adsorbing members 22 in the pipe body 21 than in the vehicle pipe member 10 of the first embodiment. Therefore, the vehicle pipe member 20 of the second embodiment can increase the adsorption amount of the fuel boil-off gas (breakthrough gas) contained in the gas as compared to the vehicle pipe member 10 of the first embodiment.

Moreover, in the vehicle pipe member 20 of the second embodiment, the adsorbing members 22 are enclosed within the bag 28, and accordingly, the adsorbing members 22 are not spilled when introduced into the pipe body 21. In addition, it is unnecessary to adjust the input amount of the adsorbing members 22. As a result, the adsorbing members 22 can be easily introduced into the vehicle pipe member 20 of the second embodiment, and the processing performance of the vehicle pipe member 20 and set-up performance at the time of manufacturing can be improved.

Third Embodiment

A vehicle pipe member 30 of a third embodiment is an example in which adsorbing members 32 are enclosed in bags 38 (second bags).

Figure 11:
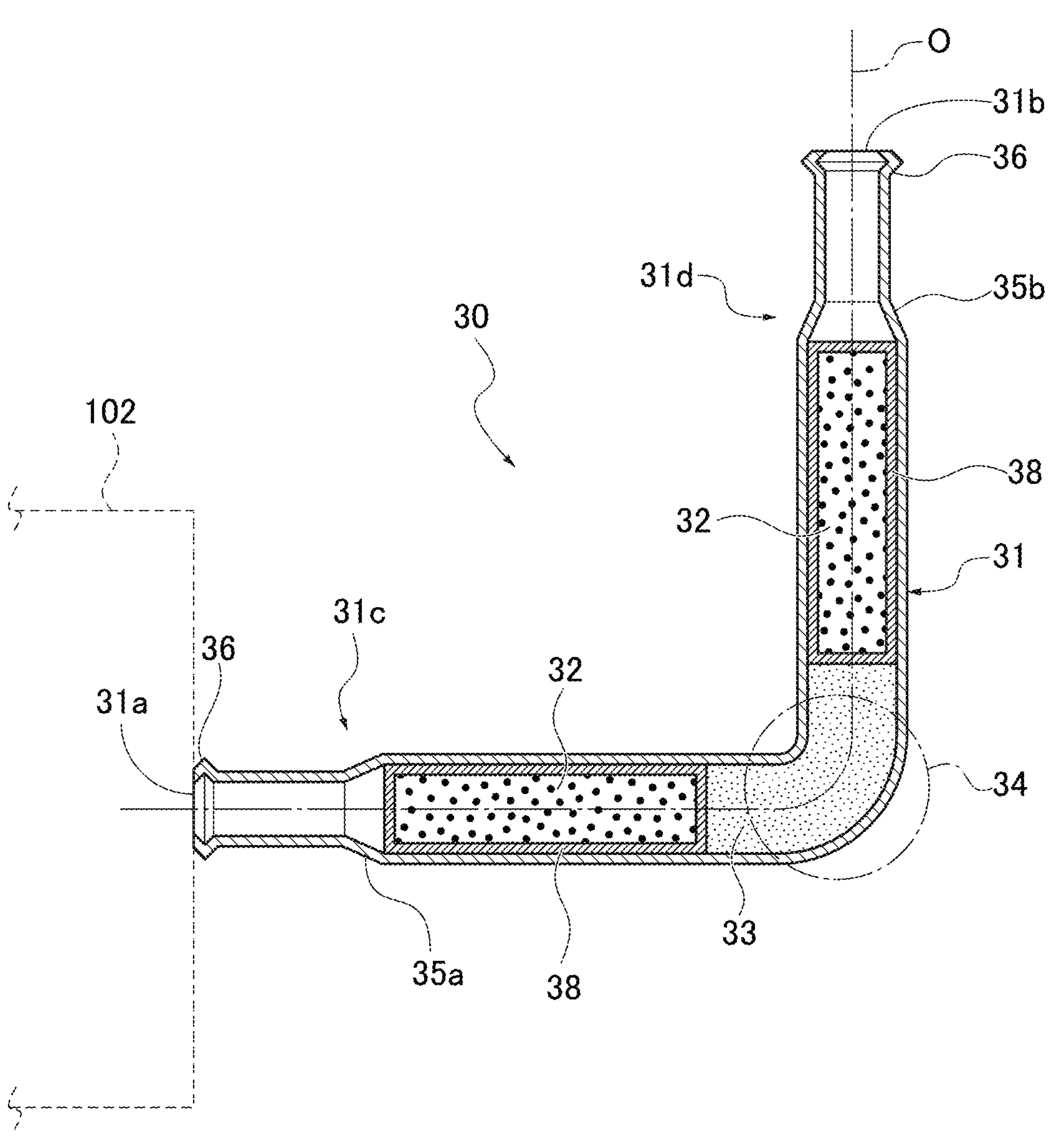
FIG. 11 is a cross-sectional view illustrating a vehicle pipe member of a third embodiment.

That is, as illustrated in FIG. 11, the vehicle pipe member 30 of the third embodiment includes a pipe body 31, the adsorbing members 32, a support member 33, and the bags 38.

The pipe body 31 is made of metal or resin similar to the first and second embodiments. The pipe body 31 includes pipe ends 31*a*, 31*b* open and a bent portion 34 formed at an intermediate portion of the pipe body 31 in the length direction. The bent portion 34 is a portion that changes the direction of the pipe axis O of the pipe body 31. In the bent portion 34 of the third embodiment, the direction of the pipe axis O is changed by 90° as viewed from the direction illustrated in FIG. 11.

The pipe body 31 of the third embodiment has the same shape as that of the pipe body of the first embodiment. The pipe body 31 includes a first small diameter portion 35*a* formed at a first end portion 31*c* and a second small diameter portion 35*b* formed at a second end portion 31*d*. Furthermore, in the pipe body 31 of the third embodiment, large diameter portions 36 are formed at the peripheral edges of the pipe ends 31*a*, 31*b*, respectively.

The adsorbing members 32 fill the pipe body 31 and adsorb fuel boil-off gas (breakthrough gas) in gas (exhaust gas) discharged from the canister 102. The adsorbing member 32 is made of, for example, activated carbon. The adsorbing member 32 of the third embodiment has a fine particle shape such as a granular shape, a powder shape, and a fibrous shape.

The support member 33 is provided within the pipe body 31 and supports the pipe body 31 from the inside to support the inner diameter of the pipe body 31. Since the support member 33 has the same configuration as the support member 13 of the first embodiment, a detailed description thereof is omitted.

The bag 38 is a cylindrical bag that encloses the adsorbing member 32, and both ends of the bag 38 are closed in a state that the adsorbing member 32 is enclosed within the bag 38. The bag 38 has air permeability that enables the ventilation of gas (exhaust gas) discharged from the canister 102. Note that the bag 38 of the third embodiment may be formed of the same material as the material of the bag 28 of the second embodiment or may not necessarily have flexibility capable of following the deformation of the pipe body 31 unlike the bag 28 of the second embodiment. Specifically, the bag 38 is preferably formed of a nonwoven fabric or a microporous film, and has heat resistance, flame retardancy, and the like.

Each of the bag 38 is filled with the adsorbing member 32. The total length of the bag 38 is set to be shorter than a length between the support member 33 and the first small diameter portion 35*a* or a length between the support member 33 and the second small diameter portion 35*b*. It is preferable that the entire length of the bag 38 is substantially the same as the length between the support member 33 and the first small diameter portion 35*a* or the length between the support member 33 and the second small diameter portion 35*b*.

Next, a method for manufacturing the vehicle pipe member 30 of the third embodiment will be described.

The method for manufacturing the vehicle pipe member 30 of the third embodiment includes a pre-step, a first step, an intermediate step, and a second step.

The pre-step is a step before the first step. In the pre-step of the third embodiment, the first small diameter portion 35*a* is formed at the first end portion 31*c* of the pipe body 31 as in the first embodiment. Since the procedure for forming the first small diameter portion 35*a* is similar to the procedure in the first embodiment, a detailed description thereof is omitted. Further, in the pre-step of the third embodiment, the adsorbing members 32 fill the bags 38 and are enclosed therein.

The first step is a step after the pre-step. In the first step, the adsorbing member 32 and the support member 33 are alternately arranged inside the pipe body 31 which has a straight pipe shape and includes the first small diameter portion 35*a* formed at the first end portion 31*c* as in the first step of the first embodiment. Here, in the first step of the third embodiment, the adsorbing members 32 are enclosed in the bags 38 in the pre-step, and the adsorbing members 32 are introduced into the pipe body 31 while enclosed within the bags 38. As a method for moving the adsorbing members 32, the adsorbing members 32 may be moved by injecting air into the pipe body 31, or a jig may be used.

The intermediate step and the second step are similar to those of the first embodiment, and accordingly, detailed descriptions thereof are omitted.

Hereinafter, the operation of the vehicle pipe member 30 of the third embodiment and the method for manufacturing the same will be described.

In the vehicle pipe member 30 of the third embodiment, the adsorbing members 32 are enclosed within the bags 38 and disposed within the pipe body 31. Accordingly, when the adsorbing members 32 are introduced into the pipe body 31 in the first step, the adsorbing members 32 are not spilled from the pipe body 31. In addition, it is not necessary to adjust the input amounts of the adsorbing members 32. As a result, the adsorbing members 32 can be easily introduced into the vehicle pipe member 30 of the third embodiment, and the processing performance of the vehicle pipe member 30 and set-up performance at the time of manufacturing can be improved.

Further, in the vehicle pipe member 30 of the third embodiment, the adsorbing members 32 do not come out from the pipe body 31, it is unnecessary to dispose the support member 33 at the end portions 31*c*, 31*d* of the pipe body 31 unlike the vehicle pipe member 10 of the first embodiment. Therefore, as compared to the vehicle pipe member 10 of the first embodiment, the vehicle pipe member 30 of the third embodiment can increase the amount of the adsorbing members 32 in the pipe body 31 and can increase the adsorption amount of the fuel boil-off gas (breakthrough gas) contained in the gas than the vehicle pipe member 10 of the first embodiment.

The vehicle pipe member and the method for manufacturing the same according to the present disclosure have been described based on the first to third embodiments. However, the specific configurations are not limited to ones shown in the embodiments, and changes, additions, modifications, and the like in design are allowed without departing from the gist of the invention according to the claims.

In the first to third embodiments, the direction of the pipe axis O of each of the vehicle pipe members 10, 20, and 30 is changed by 90° at the bent portions 14, 24, and 34. However, the bending angle of the bent portions 14, 24, and 34 is not limited to 90° and can be set to any angle according to the system layout of the fuel boil-off gas suppression system 1.

Further, in the first to third embodiments, each of the vehicle pipe members 10, 20, and 30 includes the bent portion 14, 24, and 34 at the intermediate portion of each of the pipe bodies 11, 21, and 31. However, a plurality of bent portions 14, 24, and 34 may be formed according to the system layout of the fuel boil-off gas suppression system 1.

Further, in the first embodiment, the vehicle pipe member 10 includes the adsorbing member 12 formed into a disk-shaped pellet corresponding to the dimension of the inner diameter of the pipe body 11. However, the shape of the adsorbing member 12 is not limited the disk-shape. For example, the adsorbing member 12 may be activated carbon in various shapes, such as granular, powder, or fibrous.

Further, in the method for manufacturing the vehicle pipe member 10 of the first embodiment, the support member 13 is moved by injecting air into the pipe body 11 in the first step. However, the method for moving the support member 13 is not limited thereto. For example, a jig such as a T-shaped rod may be used to push the support member 13 into the pipe body 11 to a desired position.

The invention claimed is:

1. A vehicle pipe member comprising:

a first end connected to a canister that adsorbs fuel boil-off gas in a fuel tank;

a second end open to an atmosphere;

a pipe body comprising an intermediate portion in a length direction and a bent portion formed at the intermediate portion;

a plurality of adsorbing members that fill the pipe body to adsorb the fuel boil-off gas in gas discharged from the canister to the atmosphere; and at least one support member that is provided within the pipe body to support an inner diameter of the pipe body, wherein the at least one support member is disposed at the bent portion.

2. The vehicle pipe member according to claim 1, wherein the pipe body comprises:

a first small diameter portion formed at a first end portion of the pipe body, the first small diameter portion comprising an inner diameter smaller than an inner diameter of the intermediate portion; and a second small diameter portion formed at a second end portion of the pipe body, the second small diameter portion comprising an inner diameter smaller than the inner diameter of the intermediate portion, and wherein the plurality of adsorbing members and the at least one support member are disposed between the first small diameter portion and the second small diameter portion.

3. The vehicle pipe member according to claim 1, or 2, wherein one of the plurality of adsorbing members is disposed at each of the first and second end portions of the pipe body, and wherein a first one of the plurality of adsorbing members is disposed between the support member at the first end portion of the pipe body and the support member at the bent portion, and a second one of the plurality of adsorbing members is disposed between the support member at the second end portion of the pipe body and the support member at the bent portion.

4. The vehicle pipe member according to claim 1, further comprising:

a first bag that encloses the plurality of adsorbing members and the at least one support member, the first bag having air permeability, and wherein the plurality of adsorbing members and the at least one support member are disposed within the pipe body while being enclosed in the first bag.

5. The vehicle pipe member according to claim 1, further comprising:

a second bag that encloses one of the plurality of adsorbing members, the second bag having air permeability, and wherein the adsorbing member is disposed within the pipe body while being enclosed in the second bag.

6. The vehicle pipe member according to claim 1, wherein the at least one support member has elasticity capable of expanding and contracting along a pipe axis of the pipe body.

7. A method for manufacturing a vehicle pipe member, wherein the vehicle pipe member comprises a first end connected to a canister that adsorbs fuel boil-off gas in a fuel tank and a second end open to an atmosphere;

wherein the method comprises:

a first step for disposing a plurality of adsorbing members and at least one support member within a pipe body having a straight pipe shape, the plurality of adsorbing members adsorbing the fuel boil-off gas in gas discharged from the canister to the atmosphere, and the at least one support member supporting an inner diameter of the pipe body; and a second step for forming a bent portion of the pipe body by bending the pipe body at a location where the at least one support member is disposed.

8. The method according to claim 7, further comprising:

a pre-step for forming a first small diameter portion at a first end portion of the pipe body before the first step, and wherein the first end portion comprises an inner diameter smaller than an inner diameter of an intermediate portion of the pipe body.

9. The method according to claim 7, further comprising:

an intermediate step for forming a second small diameter portion at a second end portion of the pipe body between the first step and the second step, and wherein the second end portion comprises an inner diameter smaller than an inner diameter of an intermediate portion of the pipe body.

* * * * *